Figure 3A:
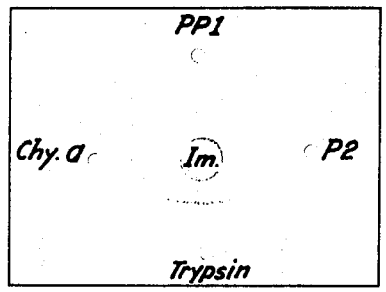

Dec. 12, 1967  J. URIEL ET AL  3,357,894
PROTEOLYTIC ENZYMES OF PIG PANCREAS
Filed Oct. 19, 1964  3 Sheets-Sheet 1
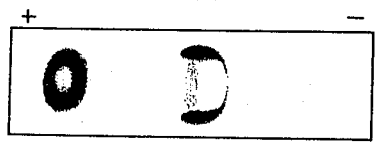
Fig. 1A.
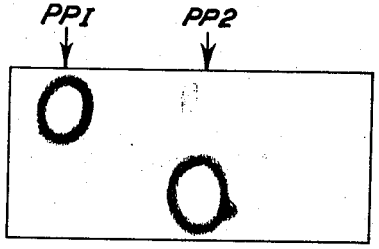
Fig. 1B.
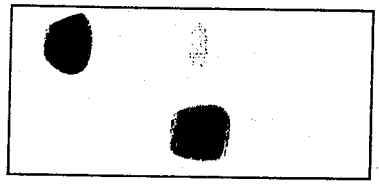
Fig. 1C.
Fig. 2.
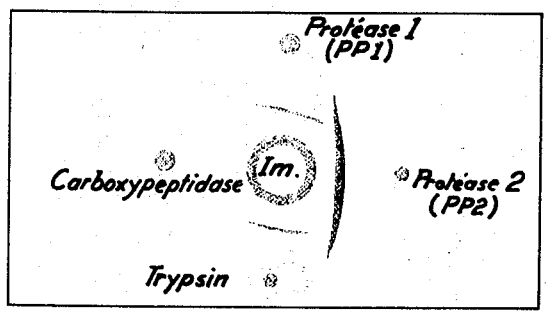
INVENTORS
José Uriel + Stratis Avrameas
By Littlepage & Quaintance
Attys.

INVENTORS
José Uriel & Stratis Avrameas
By Littlepage & Quaintance
Attys.

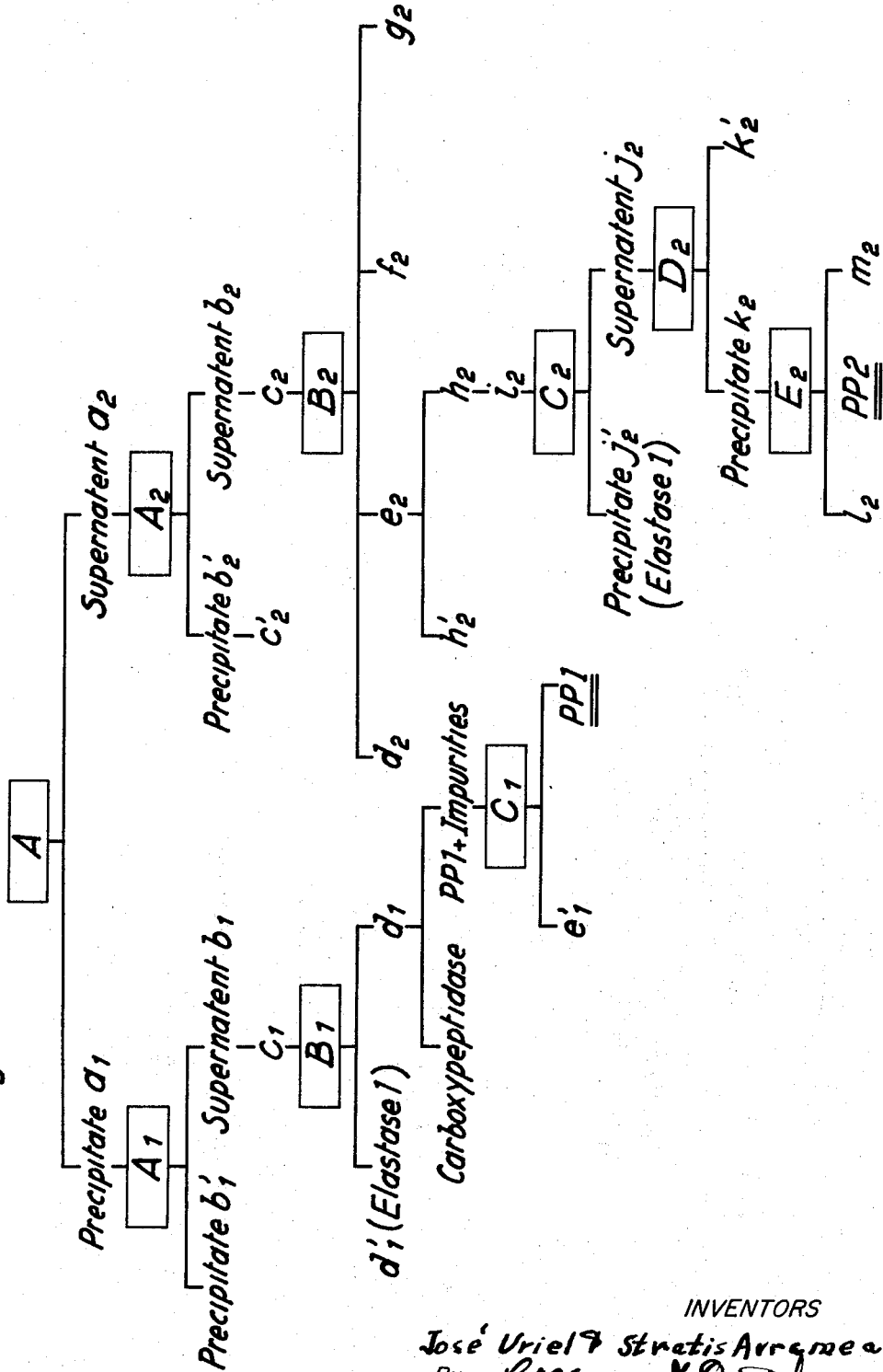

United States Patent Office 3,357,894
Patented Dec. 12, 1967

3,357,894
PROTEOLYTIC ENZYMES OF PIG PANCREAS
José Uriel, Paris, and Stratis Avrameas, Villejuif, France, assignors to Etablissement Public: Centre National de la Recherche Scientifique, Paris, France, a corporation of France
Filed Oct. 19, 1964, Ser. No. 404,615
Claims priority, application France, Oct. 18, 1963, 951,110
8 Claims. (Cl. 195—66)

The object of the present invention consists of new proteolytic enzymes of pig pancreas, hereinafter referred to by the abbreviation PP1 and PP2, and in their use.

The most characteristic property of the pancreatic proteases of the invention lies in the fact that they digest the albumin of white of egg in its native state. This property was made use of to reveal the existence of the said proteases and was used as a criterion for their purification. Generally speaking in biology a protein is in the native state when not denaturated. In other words a protein in the native state is a protein which after having been extracted with mild conditions is not submitted to any denaturating process.

Table I, (FIG. 5) attached, shows schematically a general process of preparing and isolating the two pancreatic proteases PP1 and PP2, which is described in detail hereafter.

20 g. of soluble powdered pig pancreas was dissolved in 400 ml. of demineralized water (conductivity: $10^{-6}\Omega$). In the following operations the water employed possesses the same characteristics.

The solution was adjusted to pH 3.2 with hydrochloric acid 1 N. The solution was left at 4° C. for 15 minutes and was then centrifuged at 5,000 r.p.m. for 30 minutes at 4° C. These operations are schematized in rectangle A of the Table I. After centrifuging, a precipitate $a_1$ was obtained and a supernatant liquid $a_2$.

The manner in which the precipitate $a_1$ was treated will now be described. It results in the protease PP1 of the invention being isolated, and refers to the left hand side of Table I.

The precipitate $a_1$ was placed in 400 ml. of water and the solution was adjusted to pH 6.44 with sodium hydroxide 1 N. This was agitated for one hour at 4° C. and then centrifuged at 12,000 r.p.m. for 30 minutes at 4° C. (see rectangle $A_1$). The precipitate $b'_1$ obtained was thrown away and the process was continued with the supernatant liquid $b_1$ by means of freeze drying. This gave a fraction $c_1$ weighing 5.8 g.

1 g. of the fraction $c_1$ was dissolved in 15 ml. of a buffer solution of alkaline phosphate at a concentration of 0.1 M and the pH was adjusted to 6.44. The solution obtained was passed on a cylindrical column 50 cm. high and 3.5 cm. in diameter containing an anion-exchanging resin put onto the market by Pharmacia Uppsala (Sweden) under the name of DEAE-SEPHADEX A-50 (Medium). This resin is a cross-linked polysaccharide dextran having diethylaminoethyl groups attached to the glucose units of the polysaccharide chains by ether linkages. The said resin having been equilibrated with the said buffer solution of phosphate at a temperature of 4° C. These operations are shown in the rectangle $B_1$ of the table.

After passing over the ion-exchange resin two fractions were obtained, $d'_1$ and $d_1$. The fraction $d'_1$ corresponds to the buffer solution of phosphate 0.1 M and chiefly contains elastase 1. In the following description only the major constituents of the isolated fraction is given, unless otherwise indicated. Traces of impurities are usually present in all fractions, as is normal.

The other fraction $d_1$ corresponds to the buffer solution of phosphate at 0.5 M with two peaks which contain the carboxypeptidase, and the pancreatic protease PP1 with traces of impurities, respectively. This latter fraction was treated (rectangle $C_1$ of the table), in the following manner. After dialysis and freeze-drying 50 mg. of the product was dissolved in 10 ml. of a buffer solution of phosphate 0.1 M and was adjusted to pH 6.44. This solution was then placed in a cylindrical column 25 cm. high and 2.5 cm. in diameter containing an ion-exchange resin DEAE-SEPHADEX (medium) which was equilibrated with the same buffer solution at 15° C.

Two fractions were thus obtained. The first, $e'_1$ corresponding to the phosphate buffer 0.1 M was thrown away. The second, corresponding to the phosphate buffer 0.5 M contained 25 mg. of protease PP1.

A description follows of the process of isolating the protease PP2, referring to the right hand side of the table.

The liquid $a_2$ was adjusted to pH 6.5 with sodium hydroxide, then dialysis was carried out for 18 hours at 4° C. with water which also had a pH equal to 6.5. The solution was then centrifuged at 12,000 r.p.m. for 15 minutes at 4° C. (Operations shown in rectangle $A_2$ of the table). A precipitate $b'_2$ was obtained and a supernatant liquid $b_2$.

After freeze-drying of the precipitate $b'_2$ a fraction $c'_2$ weighing 0.4 g. was obtained, with a composition substantially as follows:

PP1 and carboxypeptidase=30%
Elastase=70%

The process was continued on the supernatant liquid $b_2$ which, after freeze-drying, gave a fraction $c_2$ weighing 4.0 g.

In the stage of the treatment shown in rectangle $B_2$ 500 mg. of the fraction $C_2$ as dissolved in 10 ml. of a buffer solution of alkaline phosphate at 0.01 M, with a pH adjusted to 5.5, if necessary with HCl 0.05 N. The liquid was then poured on a column 25 cm. high and 2.5 cm. in diameter, containing a cation-exchange resin sold by Pharmacia Uppsala (Sweden) under the name of SE-SEPHADEX C-50 (medium), equilibrated by the same buffer solution. This resin is a cross-linked polysaccharide dextran having sulphoethyl groups attached to the glucose units of the polysaccharide chains by ether linkages.

Four fractions were thus obtained, $d_2$, $e_2$, $f_2$, $g_2$. The fraction $d_2$ (medium 0.01 M) contained traces of PP1 and three unidentified esterases. Fraction $e_2$ (medium 0.07 M) with two peaks was also treated, as will be described hereafter. Fraction $f_2$ corresponded to medium 0.15 M and gave mainly trypsin and elastase 2. Fraction $g_2$ (medium 0.3 M) consisted of chymotrypsin.

The fraction $e_2$ mentioned above was separated into two fractions $h'_2$ and $h_2$ corresponding respectively to two peaks. Fraction $h'_2$ contained an unidentified esterase. Fraction $h_2$ mainly contained the pancreatic protease PP2 of the invention, as well as elastase 1 and an unidentified esterase.

After the fraction $h_2$ was dialysed and freeze-dried 25 mg. of a fraction $i_2$ was obtained.

The fraction $i_2$ was treated (rectangle $C_2$) by chemical means by precipitation at 4° C. with ammonium sulphate to 50% of final saturation. A precipitate $j'_2$ was thus obtained, consisting of elastase 1 and a supernatant liquid $j_2$ on which the process was contained.

Another precipitation was carried out taking to 4° C. the concentration at 60% of saturation in ammonium sulphate (rectangle $D_2$). A new precipitate, $k_2$, was thus obtained, consisting of PP2 and esterase and a supernatant liquid $k'_2$.

The process was continued on the precipitate $k_2$ (rectangle $E_2$ of the table). The precipitate $k_2$ was mixed with 5 ml. of water. This was dialysed at 4° C. for 12 hours with H$_2$O, then with 5 l. of the buffer solution of alkaline phosphate at a concentration of 0.01 M at pH 6.44. The solution was then passed on a cylindrical column 25 cm. in height and 2.5 cm. in diameter containing an ion-exchange resin sold by Pharmacia Uppsala (Sweden) under the name of CM-SEPHADEX C–50 (medium) buffered with the buffer solution phosphate 0.01 M at pH 6.44. This resin is a cross-linked polysaccharide dextran having Carboxymethyl groups attached to the glucose units of the polysaccharide chains by ether linkages.

Three new fractions were finally obtained: a fraction $l_2$ (buffer solution 0.01 M) consisting of traces of enzymes migrating towards the anode; a fraction $m_2$ (buffer medium 0.1 M) contained the esterases; and the third fraction (buffer solution 0.05 M) contained 5 mg. of protease PP2.

It is also possible to change many steps of the preceding process of preparing and isolating the two pancreatic proteases PP1 and PP2. An example of this modified process is described in detail hereafter, the yield of which is profitable.

20 g. of soluble powdered pig pancreas was dissolved in 400 ml. of a buffer solution of alkaline phosphate at a concentration of 0.01 M and the pH was adjusted to 6.44. The solution obtained was then centrifuged at 12,000 r.p.m. for 15 minutes at 4° C. After centrifuging, a precipitate was obtained and a supernatant liquid. The said precipitate was thrown away and the process was continued with the said supernatant liquid.

The supernatant liquid was passed on a cylindrical column 50 cm. high and 3.5 cm. in diameter containing the anion-exchanging resin (DEAE-SEPHADEX A–50 (medium). The said resin having been equilibrated with the buffer solution of phosphate 0.01 M at pH 6.44.

After passing over the anion-exchange resin, four fractions were obtained. The first fraction, which corresponds to the buffer solution of phosphate 0.01 M was thrown away. The second fraction, which corresponds to the suffer solution of phosphate 0.1 M, was treated with ammonium sulphate to 80% of final saturation and then centrifuged at 12,000 r.p.m. for 15 minutes at 4° C. The supernatant liquid obtained was thrown away and the process was continued with the precipitate, which is described hereafter as precipitate P2. The third fraction, which corresponds to the buffer solution of phosphate 0.2 M was thrown away. The fourth fraction corresponds to the buffer solution of phosphate 0.5 M and was treated with ammonium sulphate to 80% of final saturation, and then centrifuged at 12,000 r.p.m. for 15 minutes at 4° C. The supernatant liquid obtained was also thrown away and the process was continued with the precipitate, which is described hereafter as precipitate P1.

The manner in which the precipitate P2 was treated will now be described. It results in the protease PP2 of the invention being isolated.

The precipitate P2 was dissolved in 50 ml. of demineralized water. The solution obtained was dialysed for 12 hours twice with 10 l. H$_2$O, then for 4 hours with 10l of the buffer solution of alkaline phosphate at a concentration of 0.01 M and pH 5.5. After the said dialysis, the fraction obtained was centrifuged at 12,000 r.p.m. for 15 minutes at 4° C., whereby a precipitate was obtained, which was thrown away, and a supernatant liquid, which is described hereafter as supernatant S2.

The said supernatant S2 was passed on a cylindrical column 40 cm. high and 2 cm. in diameter containing a cation-exchanging resin SE-SEPHADEX-C–50 medium.

The said resin having been equilibrated with the buffer solution of phosphate 0.01 M at pH 5.5. After passing over the last mentioned column, two fractions were obtained, one of which corresponds to the buffer solution 0.01 M and was thrown away. The other fraction, which corresponds to the buffer solution 0.07 M contains the desired protease PP2 and traces of impurities.

This impure PP2-fraction was treated with ammonium sulphate to 80% of final saturation and then centrifuged at 12,000 r.p.m. for 15 minutes at 4° C. The liquid supernatant obtained was thrown away and the precipitate was again dissolved in 20 ml. of HCl $10^{-4}$ N, whereby a liquid fraction was obtained. The said liquid fraction was dialysed at +4° C. in the presence of twice 10 l. of HCl $10^{-4}$ N. After freeze-drying, the desired protease PP2 was obtained.

A description follows of the process of isolating the protease PP1. The aforementioned precipitate P1 was dissolved in a buffer solution of phosphate 0.1 M at pH 6.5. The solution obtained was dialysed in the presence of thrice 10 l. H$_2$O, whereby a suspension was prepared. The said suspension was treated with an aqueous solution of LiCl at concentration 0.1 M and the pH valve was adjusted to 7. After centrifuging at 12,000 r.p.m. for 15 minutes at 4° C., a precipitate was obtained and thrown away, and a liquid supernatant, which is described hereafter as supernatant S1.

The said supernatant S1 was dialysed with 30 liters of a buffer solution of sodium acetate-acetic acid 0.005 M for 48 hours, whereby a suspension in a liquid fraction was prepared. The said fraction was centrifuged at 12,000 r.p.m. for 15 minutes at 4° C. The liquid supernatant obtained was thrown away and the separated precipitate was placed in suspension in 10 ml. of aqueous solution LiCl 0.1 M, the pH having been adjusted to 7. The solid precipitate obtained was the desired protease PP1.

It should be noted that other proteolytic enzymes of the pancreas, some of which are known and others which have not yet been identified, are obtained by the process of separation employed. At each stage of the process of isolation the products of fractionation were controlled by techniques of enzyme characterisation (J. Uriel Ann. N.Y. Acad. Sciences 1963, 103, 956) applied on double diffusion slides in agar (O. Ouchterlony, Ach. Path. Microb. Scand. 1949, 26 507) and on immunoelectrophoresis slides (P. Grabar and C. Williams, Bioch. Biophys. Acta, 1953, 3, 17). The results of a typical example of electrophoresis and double immunidiffusion in agar with subsequent characterisation of enzymes in specific immune precipitates are shown in the attached drawing in which:

FIG. 1 shows the results of an electrophoresis in agar of a total pancreatic extract (A) and the two pancreatic proteases of the invention. PP1 and PP2 (B and C) after they have been isolated. A—Proteolytic activity of the total extract in relation to natural ovalbumin. B—Proteolytic activity of isolated PP1 and PP2 in relation to the same substrate. C—PP1 and PP2 coloured with amide black.

FIG. 2 shows the results of a double diffusion in agar. Colouring of the esterase activity in relation to the acetyl-phenyl-alanine naphthyl ester. I$m$=total pancreatic anti-extract immune serum.

Figure 3B:
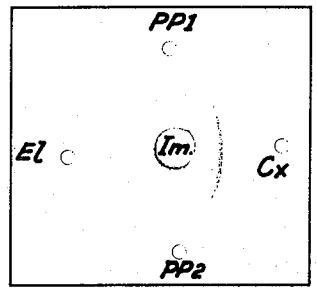

FIG. 3 also shows the results of a double diffusion in agar. I$m$=total pancreatic anti-extract immune serum. A—characterisation with benzyl-arginine-naphthyl-amide. Chy. a=chymotrypsin A. B—characterisation with carbo-naphthoxy-phenyl alanine E$l$=elastase. C$x$=carboxypeptidase.

Figure 4A:
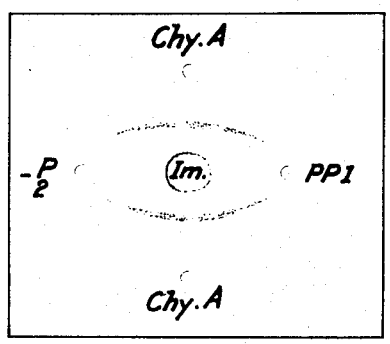
Figure 4B:
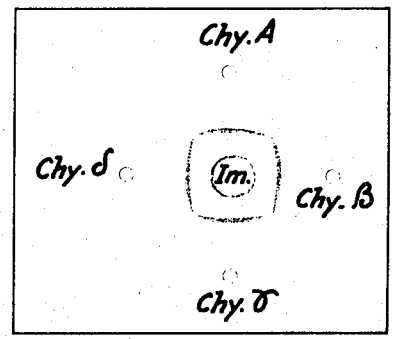

FIG. 4 also shows the results of a double diffusion in agar. I$m$=immune serum anti-chymotrypsin A. Chy. A, Chy $\beta$, Chy $\gamma$, and Chy $\delta$=respectively, chymotrypsine A, $\beta$, $\gamma$, and $\delta$.

The methods of separation and control employed are much more sensitive than previously known methods, such as electrophoresis, ultracentrifugation, crystallization, chromatography, or catalytic activity.

The physico-chemical and catalytic properties of pancreatic proteases PP1 and PP2 have been studied comparing them with those of trypsin, carboxy-peptidase, elastase and chymotrypsins A, $\beta$, $\gamma$ and $\delta$. All these enzymes have a proteolytic activity in which the optimum pH lies between 7.5 and 8, and is the case with PP1 and PP2.

Physico-chemical properties

The electrophoretic mobilities were obtained by electrophoresis in agar in a veronal buffer 0.025 M, pH 8.2 according to the method described by J. Uriel (Clin. Chim. Acta, 1958, 3, 234). Table II given hereafter summarizes the results thus obtained:

TABLE II

| Enzyme | $U \times 10^5/cm.^2/volt^{-1}/sec.^{-1}$ [1] |
| --- | --- |
| PP1 | —8.12 |
| Carboxypeptidase | —4.72 |
| PP2 | —0.87 |
| Elastase 1 | —0.60 |
| Chymotrypsin A | +0.10 |
| Elastase 2 | +1.48 |
| Trypsin | +2.96 |

[1] The signs (—) and (+) indicate the respective values of anodic and cathodic mobilities.

The pancreatic protease 1 (PP1) is an euglobulin. Its molecular weight is equal to 24,000±300. Its sedimentation constant is equal to 3.03 U. Sitedberg. It undergoes progressive self-degradation to pH 3.

The pancreatic protease 2 (PP2), is a water-soluble globulin and does not appear to be modified after 24 hours to pH 3, in regard with its initial catalytic properties.

Catalytic properties

Catalytic activities on synthetic and natural substrates were studied by characterisation methods after electrophoresis and immunoelectrophoresis in a gelified medium, as described, for example by J. Uriel (Ann. N.Y. Acad. Sciences 1963, 103, 956) and by titrimetric methods using an apparatus to detect pH such as those published by C. F. Iacobsen, J. Leonis, K. Linderstrøm-Lang and M. Ottensen in D. Glick. Methods of Biochemical Analysis, V. IV, 171, 1957.

The results obtained can be summarized as follows:

The proteases PP1 and PP2 according to the invention hydrolyse the naphthyl-esters of benzoyl- and acetylphenylalanine, as well as an acetyl tyrosine ethyl-ester hereafter referred to by the abbreviation ATEE, substrates which are commonly considered as being representative of a chymotrypsin type activity. By titrimetric methods, the hydrolytic activity of PP1 and PP2 and comparatively that of chymotrypsin A, in relation to ATEE give the following results (Table III).

TABLE III

| Preparation | Specific activity[1] (micromoles ATEE/min./mg.) |
| --- | --- |
| PP1 | 123 |
| PP2 | 115 |
| Chymotrypsin A | 600 |

[1] Specific activity=micromoles of ATEE hydrolysed per minute and per milligram of enzyme ($t=37°$ C.; pH=8).

The protease PP1 and PP2 hydrolyse the acid poly-*l*-glutamique put onto the market by Yeda (Israel) at pH 5,5 (see Table IV).

TABLE IV

| Preparation | Specific activity[1] |
| --- | --- |
| PP1 | 1.21 |
| PP2 | 0.10 |

[1] Specific activity=micromoles of NaOH consumed per minute and per milligram of proteins.

The new proteolytic enzymes PP1 and PP2 hydrolyse β-naphthyl acetate, which are the synthetic substrate of carboxylic esterases in general. Trypsin, elastase 2 and the chymotrypsins also hydrolyse this substrate.

The proteases PP1 and PP2 of the invention do not hydrolyse the benzoyl-*l*-arginine-2-naphthyl amide, or the benzoyl-*l*-arginine-para-nitroanilide, substrates having a specificity of the trypsin type.

The new proteases PP1 and PP2 do not hydrolyse carbonaphthoxy-*l*-phenyl-alanine or CBZ-glycyl-*l*-phenyl-aniline which are the specific substrate of carboxypeptidase.

The enzymes PP1 and PP2 according to the invention hydroylse, among others, the following proteins in their native state, in solution in a veronal buffer, 0.05 M; pH 8.2; human and bovine albumin serum, hemoglobin, casein, lactoglobulin, ovalbumin and human gamma-globulin.

With the exception of casein and human gamma-globuline all these proteic solutions were prepared from crystallized preparations which were controlled for purity by electrophoretic and immunichemical methods.

With the exception of ovalbumin these proteic solutions are also hydrolysed by trypsin and chymotrypsins, but to a very much lesser extent.

*Only the proteases PP1 and PP2 hydrolyse native ovalbumin.*—The hydrolytic activity measured by titrimetric methods gave the following result:

TABLE V

| Preparation | Specific activity[1] (micromoles OHNa/min./Mg.) |
| --- | --- |
| PP1 | 0.96 |
| PP2 | 1.88 |

[1] Specific activity: micromoles of sodium hydroxide consumed per minute and per milligram of enzyme ($t=37°$ C.; pH=8).

The enzymes PP1 and PP2 hydrolyse these same proteic solutions when they are previously submitted to the action of various denaturing agents: heat, urea, acids, etc. . . .

The products according to the invention, PP1 and PP2, do not hydrolyse elastin.

The new proteases PP1 and PP2 are inhibited by diisopropyl fluorophosphate.

The proteases according to the invention, PP1 and PP2, may be used as potentialization agents for other pancreatic enzymes such as trypsin, or the chymotrypsins, whose hydrolytic attack is better on denatured proteins.

It is obvious that the present invention is not limited to the preceding indications, which are simply given as examples of therapeutic uses of the proteases PP1 and PP2, owing to their very varied curative, preventive and dietetic properties.

What we claim is:

1. A method for producing proteolytic enzymes from pig pancreas capable of digesting egg white albumin in native state, comprising the steps of dissolving powdered pig pancrease in demineralized water at a strongly acid pH value, whereby a first aqueous pancreatic solution and a remaining first undissolved pancreatic fraction are obtained, separating said first pancreatic solution from said first undissolved pancreatic fraction, dissolving said first undissolved pancreatic fraction in deminearlized water at a pH value just below neutrality, whereby a second aqueous pancreatic solution and a remaining second undissolved pancreatic fraction is obtained, separating said second pancreatic solution from said second undissolved pancreatic fraction, freeze drying and second pancreatic solution, whereby a first solid fraction is obtained, dissolving at least part of said first solid fraction in a buffer phosphate solution at a pH value just below neutrality, passing said dissolved first solid fraction through a first ion exchanger column thereby obtaining an elastase fraction, a carboxypeptidase fraction and an impure pancreatic protease fraction, dialysing and freeze drying said pancreatic protease fraction, whereby a second solid fraction is obtained, dissolving said second solid fraction in a buffer phosphate solution at a pH value just below neutrality, passing said dissolved second solid fraction through a second ion exchanger column whereby a desired first protease fraction is separated, adjusting the pH value of said first aqueous pancreatic solution just below neutrality, dialysing said adjusted first pancreatic solution, whereby a solid protease-carboxypeptidase-elastase fraction and a third aqueous pancreatic solution are obtained, separating said solid protease-carboxypeptidase-elastase fraction from said third aqueous pancreatic solution, freeze drying said third aqueous pancreatic solution, whereby a third solid fraction is obtained, dissolving said third solid fraction in a phosphate buffer solution at a moderately acid pH value, passing said dissolved third solid fraction through an ion exchanger column, whereby four fractions are obtained, one of which shows two peaks corresponding to two sub-fractions, one of said sub-fractions being an esterase and the other a pancreatic protease-elastase-esterase sub-fraction, dialysing and freeze-drying said other sub-fraction, whereby a fourth solid fraction is obtained, dissolving said fourth solid fraction in demineralized water, adding an ammonium sulfate solution to said dissolved fourth solid fraction up to 50% of final saturation, whereby a first precipitate and a first supernatant are obtained, separating said first precipitate from said first supernatant, adding an ammonium sulfate solution to said first supernatant up to 60% of final saturation, whereby a second precipitate and a second supernatant are obtained, separating said second precipitate from said second supernatant, dissolving said second precipitate in demineralized water, dialysing said dissolved second precipitate first in the presence of water then in the presence of a phosphate buffer solution at a pH value just below neutrality, passing said dialysed dissolved precipitate through an ion exchanger column, whereby two extreme fractions and one medium desired second protease fraction are obtained.

2. A method for producing a proteolytic enzyme from pig pancreas capable of digesting egg white albumin in native state, comprising the steps of dissolving powdered pig pancreas in demineralized water at a strongly acid pH value, whereby a first aqueous pancreatic solution and a remaining first undissolved pancreatic fraction are obtained, separating said first pancreatic solution from said first undissolve dpancreatic fraction, dissolving said first undissolved pancreatic fraction in demineralized water at a pH value just below neutrality, whereby a second aqueous pancreatic solution and a remaining second undissolved pancreatic fraction is obtained, separating said second pancreatic solution from said second undissolved pancreatic fraction freeze drying said second pancreatic solution, whereby a first solid fraction is obtained, dissolving at least part of said first solid fraction in a buffer phosphate solution at a pH value just below neutrality, passing said dissolved first solid fraction through a first ion exchanger column thereby obtaining an elastase fraction, a carboxypeptidase fraction and an impure pancreatic protease fraction, dialysing and freeze drying said pancreatic protease fraction, whereby a second solid fraction is obtained, dissolving said second solid fraction in a buffer phosphate solution at a pH value just below neutrality, passing said dissolved second solid fraction through a second ion exchanger column whereby the desired protease fraction is separated.

3. A method for producing a proteolytic enzyme from pig pancreas capable of digesting egg white albumin in native state, comprising the steps of dissolving powdered pig pancreas in demineralized water at a strongly acid pH value, whereby a first aqueous pancreatic solution and a remaining first undissolved pancreatic fraction are obtained, separating said first pancreatic solution from said first undissolved pancreatic fraction, adjusting the pH value of said first aqueous pancreatic solution just below neutrality, dialysing said adjusted first pancreatic solution, whereby a solid protease-carboxypeptidase-elastase fraction and a second aqueous pancreatic solution are obtained, separating said solid protease-carboxypeptidase-elastase fraction from said second aqueous pancreatic solution, freeze drying said second aqueous pancreatic solution, whereby a first solid fraction is obtained, dissolving said first solid fraction in a phosphate buffer solution at a moderately acid pH value, passing said dissolved first solid fraction through an ion exchanger column, whereby four fractions are obtained, one of which shows two peaks corresponding to two sub-fractions, one of said sub-fractions being an esterase and the other a pancreatic protease-elastase-esterase sub-fraction, dialysing and freeze drying said other sub-fraction, whereby a second solid fraction is obtained, dissolving said second solid fraction in demineralized water, adding an ammonium sulfate solution to said dissolved second solid fraction up to 50% of final saturation whereby a first precipitate and a first supernatant are obtained, separating said first precipitate from said first supernatant, adding an ammonium sulfate solution to said first supernatant up to 60% of final saturation, whereby a second precipitate and a second supernatant are obtained, separating said second precipitated from said second supernatant, dissolving said second precipitate in demineralized water, dialysing said dissolved second precipitate first in the presence of water then in the presence of a phosphate buffer solution at a pH value just below neutrality, passing said dialysed dissolved precipitate through an ion exchanger column, whereby two extreme fractions and one medium desired protease fraction are obtained.

4. A method for producing a proteolytic enzyme from pig pancreas capable of digesting egg white albumin in native state, comprising the steps of dissolving powdered pig pancreas in a first buffer phosphate solution at a pH value just below neutrality, whereby a first phosphate pancreatic solution and a remaining first undissolved pancreatic fraction are obtained, separating said first phosphate pancreatic solution from said first undissolved pancreatic fraction, passing said first phosphate pancreatic solution through an anion exchanger column, whereby four phosphate pancreatic fractions are obtained, one of which corresponds to the higher concentration of the said first buffer phosphate solution and is a second phosphate pancreatic solution, the three remaining phosphate pancreatic fractions having two-extreme fractions and a fraction of medium concentration consisting of a third phosphate pancreatic solution, adding an ammonium sulfate solution to said second phosphate pancreatic solution up to 80% of final saturation, whereby a first precipitate and a first supernatant are obtained, separating said first precipitate from the said first supernatant, dissolving the said first precipitate in a second buffer phosphate solution at a pH value just below neutrality, whereby a fourth phosphate pancreatic solution is obtained, dialysing the said fourth phosphate pancreatic solution in the presence of water, whereby a first pancreatic suspension is obtained, adding a lithium chloride solution to the said first pancreatic suspension at a neutral pH value, whereby a second supernatant and a second precipitate are obtained, separating said second supernatant from said second precipitate, dialysing the said supernatant with a buffer solution sodium acetate-acetic acid at an acid pH value, whereby a third supernatant and a third precipitate are obtained, separating the said third supernatant from the said third precipitate, placing in suspension the said third precipitate in a lithium chlorde solution at a neutral pH value, whereby a desired first protease is separated, adding an ammonium sulfate solution to said third phosphate pancreatic solution up to 80% of final saturation, whereby a fourth precipitate and a fourth supernatant are obtained, separating said fourth precipitate from said fourth supernatant, dissolving said fourth precipate in demineralized water, whereby a fifth phosphate pancreatic solution is obtained, dialysing said fifth phosphate pancreatic solution first in the presence of water, then in the presence of said first buffer phosphate solution, whereby a fifth supernatant and a fifth precipitate are obtained, separating said fifth supernatant from said fifth precipitate, passing said fifth supernatant through a cation exchanger column, thereby obtaining a sixth phosphate pancreatic solution and an impure pancreatic protease fraction, adding an ammonium sulfate solution to said impure pancreatic protease fraction, whereby a sixth supernatant and a sixth precipitate are obtained, separating said sixth supernatant from said sixth precipitate, dissolving said sixth precipitate in hydrochloric acid, whereby a second impure pancreatic fraction is obtained, dialysing said second impure pancreatic fraction in the presence of hydrochloric acid, whereby a pure pancreatic fraction is obtained, freeze-drying said pure pancreatic fraction, whereby a desired second protease is separated.

5. A method for producing a proteolytic enzyme from pig pancreas capable of digesting egg white albumin in native state, comprising the steps of dissolving powdered pig pancreas in a first buffer phosphate solution at a pH value just below neutrality, whereby a first phosphate pancreatic solution and a remaining first undissolved pancreatic fraction are obtained, separating said first phosphate pancreatic solution from said first undissolved pancreatic fraction, passing said first phosphate pancreatic solution through an anion exchanger column, whereby four phosphate pancreatic fractions are obtained, one of which corresponds to the higher concentration of the said first buffer phosphate solution and is a second phosphate pancreatic solution, the three remaining phosphate pancreatic fractions having two extreme fractions and a fraction of medium concentration consisting of a third phosphate pancreatic solution, adding an ammonium sulfate solution to said second phosphate pancreatic solution up to 80% of final saturation, whereby a first precipitate and a first supernatant are obtained, separating said first precipitate from the said first supernatant, dissolving the said first precipitate in a second buffer phosphate solution at a pH value just below neutrality, whereby a fourth phosphate pancreatic solution is obtained, dialysing the said fourth phosphate pancreatic solution in the presence of water, whereby a first pancreatic suspension is obtained, adding a lithium chloride solution to the said first pancreatic suspension at a neutral pH value, whereby a second supernatant and a second precipitate are obtained, separating said second supernatant from said second precipitate, dialysing the said second supernatant with a buffer solution sodium acetate-acetic acid at an acid pH value, whereby a third supernatant and a third precipitate are obtained, separating the said third supernatant from the said third precipitate, placing in suspension the said third precipitate in a lithium chloride solution at a neutral pH value, whereby the desired protease is separated.

6. A method for producing proteolytic enzymes from pig pancreas capable of digesting egg white albumin in native state, comprising the steps of dissolving powdered pig pancreas in a first buffer phosphate solution at a pH value just below neutrality, whereby a first phosphate pancreatic solution and a remaining first undissolved pancreatic fraction are obtained, separating said first phosphate pancreatic solution from said first undissolved pancreatic fraction, passing said first phosphate pancreatic solution through an anion exchanger column, whereby four phosphate pancreatic fractions are obtained, one of which corresponds to the higher concentration of the said first buffer phosphate solution and is a second phosphate pancreatic solution, the three remaining phosphate pancreatic fractions having two extreme fractions and a fraction of medium concentration consisting of a third phosphate pancreatic solution, adding an ammonium sulfate solution to said third phosphate pancreatic solution up to 80% of final saturation, whereby a first precipitate and a first supernatant are obtained, separating said first precipitate from said first supernatant, dissolving said first precipitate in demineralized water, whereby a fourth phosphate pancreatic solution is obtained, dialysing said fourth phosphate pancreatic solution first in the presence of water, then in the presence of said first buffer phosphate solution, whereby a second supernatant and a second precipitate are obtained, separating said second supernatant from said second precipitate, passing said second supernatant through a cation exchanger column, thereby obtaining a fifth phosphate pancreatic solution and an impure pancreatic protease fraction, adding an ammonium sulfate solution to said impure pancreatic protease fraction, whereby a third supernatant and a third precipitate are obtained, separating said third supernatant from said third precipitate, dissolving said third precipitate in hydrochloric acid, whereby a second impure pancreatic fraction is obtained, dialysing said second impure pancreatic fraction in the presence of hydrochloric acid, whereby a pure pancreatic fraction is obtained, freeze-drying said pure pancreatic fraction, whereby the desired second protease is separated.

7. The proteolytic enzyme obtained by the process of claim 5.

8. The proteolytic enzyme obtaind by the process of claim 6.

References Cited
UNITED STATES PATENTS

| | | | |
|---|---|---|---|
| 2,803,585 | 8/1957 | Frederiksen | 167—75 |
| 2,573,099 | 10/1951 | Frederiksen | 167—75 |
| 2,571,126 | 10/1951 | Frederiksen | 167—75 |

ALBERT T. MEYERS, *Primary Examiner.*

SAM ROSEN, *Examiner.*

L. RANDALL, *Assistant Examiner.*

UNITED STATES PATENT OFFICE
CERTIFICATE OF CORRECTION

Patent No. 3,357,894                      December 12, 1967

José Uriel et al.

It is hereby certified that error appears in the above numbered patent requiring correction and that the said Letters Patent should read as corrected below.

Column 3, line 40, for "suffer" read -- buffer --; column 5, line 75, for "carbonaphthoxy-1-phenyl-alanine" read -- carbonaphthoxy-dl-phenyl-alanine --; column 6, line 58, for "and" read -- said --; column 7, line 37, for "undissolve dpancreatic" read -- undissolved pancreatic --; column 8, line 53, after "said", second occurrence, insert -- second --.

Signed and sealed this 7th day of January 1969.

(SEAL)
Attest:

Edward M. Fletcher, Jr.                      EDWARD J. BRENNER
Attesting Officer                              Commissioner of Patents